FIG. I

INVENTOR
H. H. ABBOTT
BY
[signature]
ATTORNEY

INVENTOR
H. H. ABBOTT
BY [signature]
ATTORNEY

United States Patent Office 3,166,642
Patented Jan. 19, 1965

3,166,642

SIGNALING ARRANGEMENT

Henry H. Abbott, Chatham, N.J., assignor to Bell Telephone Laboratories, Incorporated, New York, N.Y., a corporation of New York Filed Dec. 21, 1961, Ser. No. 161,020
12 Claims. (Cl. 179—84)

Figure 1:
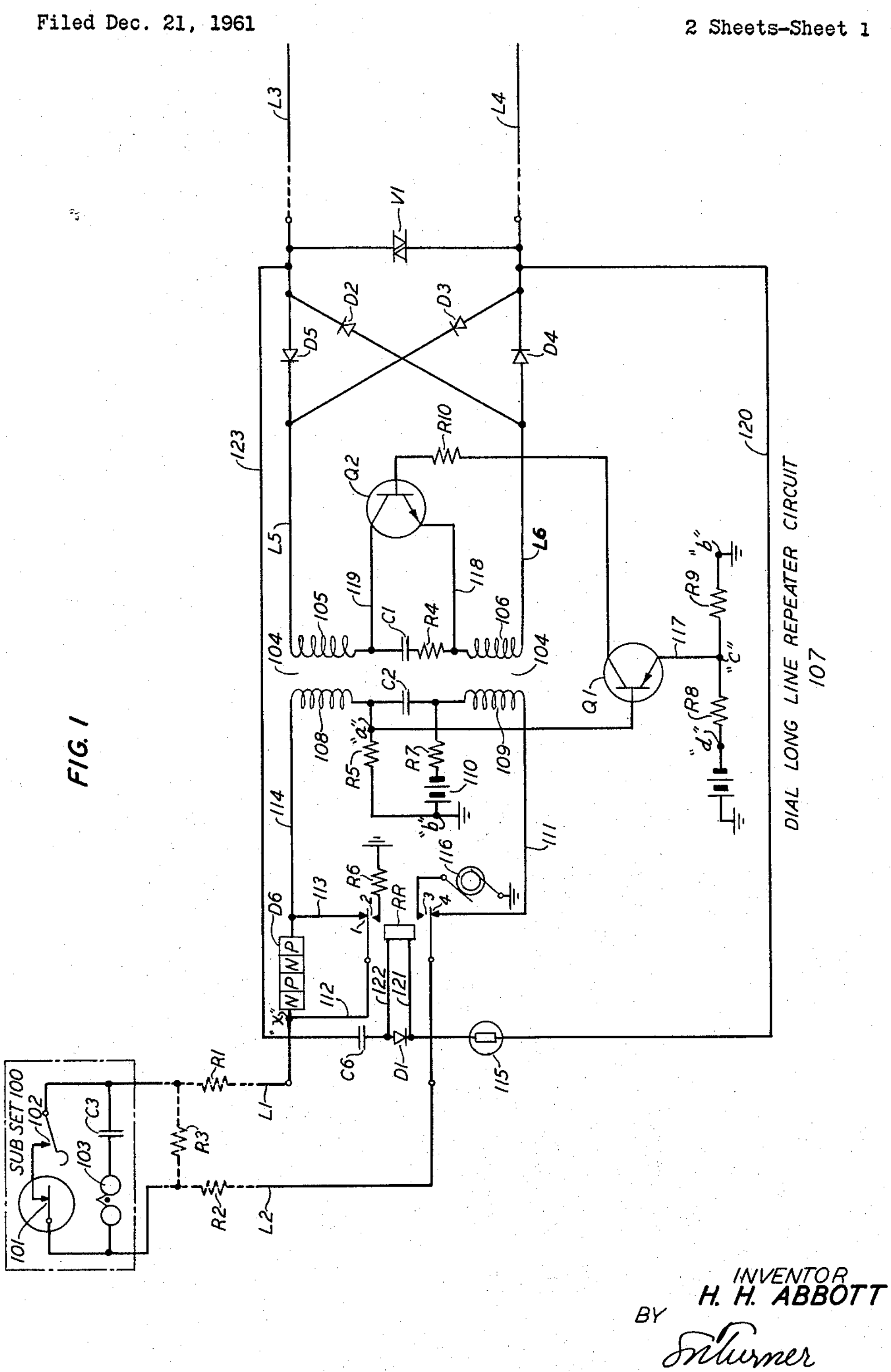

My invention relates to signaling arrangements and particularly to arrangements for repeating and controlling signals of a variable nature.

More particularly my invention relates to two-way signal repeaters, capable of repeating and controlling signals over signaling channels, wherein the signals are of inconstant magnitudes.

In a more specific aspect, my invention relates to dial telephone long line repeaters whereby dial impulses are received from the customer's station and repeated to the central office, whereby interrupted ringing signals are received from the central office and repeated over a telephone line to the customer's station and whereby means under the control of the customer are provided for tripping the central office ringing signal.

In extensive communications networks employing a plurality of communication centers, such as the many telephone central offices of a large telephone switching network, it is essential that these centers be interconnected so that each center can communicate with all other centers in the network.

Some of these centers, being widely separated, require means for overcoming the natural losses encountered when signals are transmitted over long communication channels. One method of overcoming these losses is to provide signal repeaters at intermediate points in the communication channel. Repeaters such as these receive low level signals from the originating center, amplify or reconstruct the signals and repeat the new signals to the distant terminus at a higher level.

In repeated signaling arrangements it is often desirable to control the original signal from the distant terminus. This can be accomplished over a separate control channel or more advantageously, over the same channel upon which the signal is transmitted.

With the latter arrangement, a signaling device is employed at the terminus to alter the repeated signal while this signal is being monitored by a superisory circuit in the repeater. Upon detecting a change in the repeated signal, the supervisory circuit responds and actuates a control circuit to effect the desired control of the original signal.

Certain problems are inherent in this method of signal control especially where signals of a variable magnitude are encountered. For instance, it is difficult to design supervisory instrumentalities capable of distinguishing between signal variations, such as those caused by the operation of the signaling device for control purposes, and variations in signal magnitudes.

There are supervisory arrangements available that overcome this problem by employing a plurality of monitoring or detecting elements equal to the multiplicity of signal magnitudes anticipated. Each detector is designed to function under control of the signaling device only in the presence of that particular signal magnitude for which it is designed. These detectors are capable of rapid response but only over a narrow range of signal magnitudes. In addition, the plurality of components and complex interconnecting circuitry make these arrangements more cumbersome and costly.

Some other supervisory arrangements employ a single detecting element that is responsive to changes caused by the signaling device over a wide range of signal magnitudes. Although less complex circuitry is required in these arrangements, the detecting elements are inherently sluggish and less sensitive due to their broad design characteristics.

It is therefore an object of my invention to improve signaling arrangements.

It is another object of my invention to improve the control mechanism of signal repeating arrangements wherein undulating signals are encountered.

Another object of my invention is to improve the control of signals of inconstant magnitude using a simple inexpensive supervisory detecting element.

A further object of my invention is to improve the response characteristics of mechanisms for controlling signals of high and low magnitudes.

A more specific object of my invention is to improve telephone long line repeater signaling arrangements.

Another more specific object of my invention is to improve pulse repeating and ringing trip features of dial long line repeater circuits.

In one exemplary embodiment described herein, I have depicted my invention in a dial telephone long line repeater circuit. Repeater circuits such as this are usually employed to extend the central office loop signaling range so that service can be provided for customers remote from the central office.

The repeater circuit is connected to the subscriber's line conductors at an intermediate point between the subscriber's station and the central office forming two separate signaling circuits, a subscriber signaling circuit and a central office signaling loop circuit. The two circuits are interconnected by a repeat coil for voice transmission, and circuitry is provided for repeating low voltage direct-current signals, such as dial impulses and switchhook supervision, from the subscriber's signaling circuit, around the repeat coil, to the central office loop. In addition, circuitry is provided for repeating high voltage central office ringing signals from the central office loop, around the repeat coil, to the subscriber's signaling circuit.

In the repeater I have provided a single supervisory transistor detecting element which monitors the subscriber's signaling circuit to detect voltage changes caused by the operation of the station dial or switchhook. This detector, being highly sensitive, responds to rapid voltage changes to trigger a second transistor device connected to the central office loop. The second device repeats the subscriber's signals over the central office loop by intermittently opening and closing the loop in accordance with the opening and closing of the subscriber's dial or switchhook contacts.

This detector must also detect an off-hook condition during a ringing cycle when the subscriber's signaling circuit is being intermittently subjected to a local high voltage ringing signal under control of the central office ringing signal. To preclude the false operation of the detecting device when the subscriber's signaling circuit is switched from a low voltage dialing to a high voltage ringing condition, I have provided means for altering the circuit parameters in the subscriber's signaling circuit to maintain a relatively constant voltage on the base of the supervisory transistor.

This means is under control of the central office ringing signal to render effective different parameters in accordance with the magnitude of the voltage connected to the subscriber's signaling circuit.

The detector, however, is still responsive to a voltage change caused by the subscriber going off hook, regardless of what circuit parameters are effective thereby enabling the subscriber to trip the central office ringing signal during the ringing or silent interval.

Accordingly, one feature of my invention is found in the use of a sensitive supervisory detector and means for controlling the response of this detector over a wide range of signal variations.

Another feature of my invention resides in means for altering the signaling circuit in order to maintain a relatively constant electrical condition therein regardless of the magnitude of the voltage applied.

Still another feature of my invention is found in means for maintaining a relatively constant voltage on the supervisory detector under control of an undulating signal.

A further feature of my invention resides in the use of a voltage dividing network under control of a received signal for adjusting the voltage on the base of a supervisory transistor.

Still another feature of my invention is found in the use of a voltage controlled variable impedance to limit the voltage at the base of the supervisory transistor during the application of a high voltage ringing signal.

A more specific feature of my invention is a subscriber long line dial pulse and ringing repeater arrangement having a single supervisory detector responsive to subscriber signals for pulse repeating and ringing trip and having switching means under control of a central office ringing signal to change the circuit parameters in the subscriber's signaling circuit to maintain a relatively constant electrical condition at the detector when the subscriber is intermittently rung.

A still more specific feature of my invention in a repeater arrangement of the aforementioned type resides in the relay circuitry that alternately renders one subscriber signaling circuit effective during the central office ringing interval and renders another subscriber signaling circuit effective during the silent interval of the central office signal whereby voltage regulating means including a breakdown device is also rendered effective during the ringing interval to limit the voltage at the common detector until the subscriber goes off hook thereby causing the device to break down.

Figure 2:
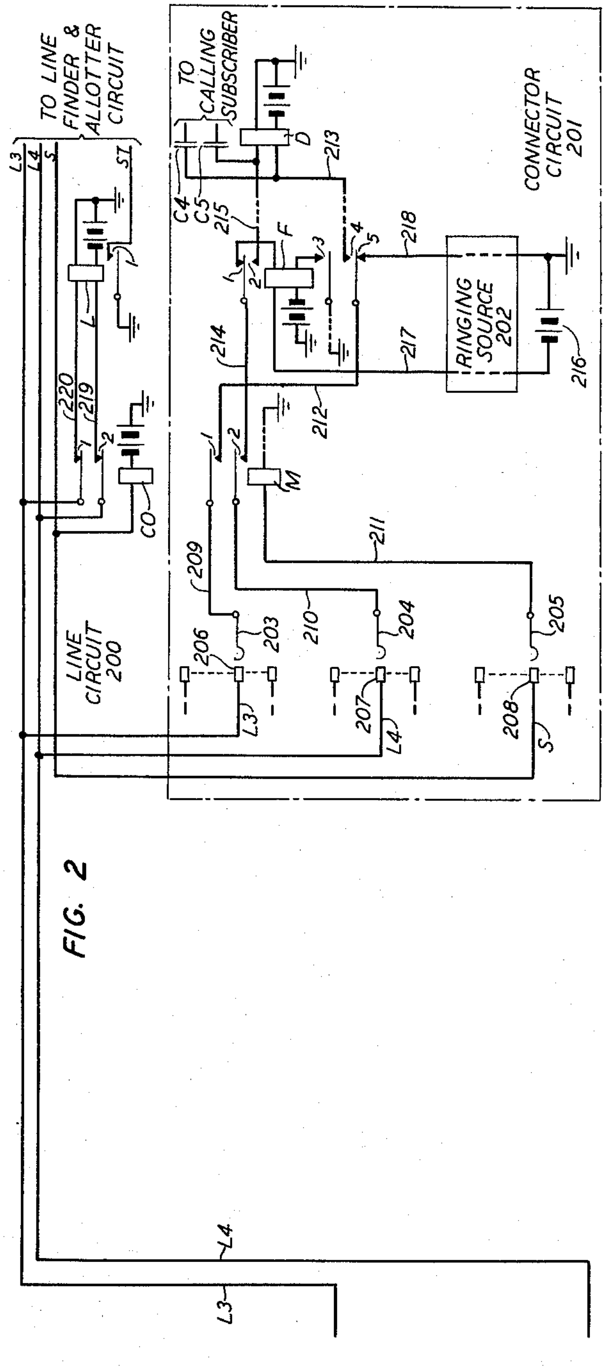
Figure 3:
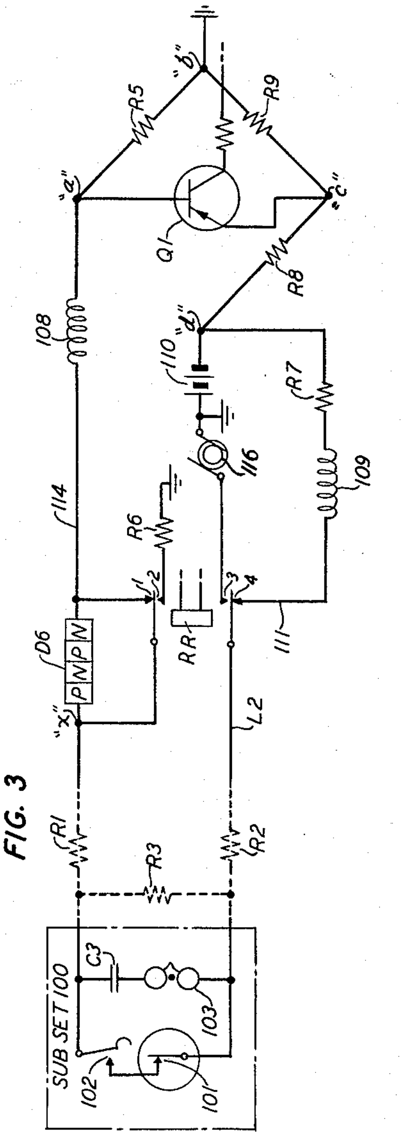

These and other objects and features will become apparent from the following detailed description of the circuit and its operation made with reference to the drawing in which:

FIG. 1 and FIG. 2, when placed with FIG. 1 to the left of FIG. 2, represent a dial long line repeater circuit connected between a dial telephone subset and a step-by-step telephone central office;

FIG. 3 is a schematic representation of a portion of FIG. 1 redrawn as an aid to understanding the circuitry.

Referring first to FIG. 2, I have shown only that portion of a step-by-step central office which is necessary to illustrate how the long line repeater circuit functions on both originating and terminating calls.

It will be obvious from the ensuing remarks that my invention is not limited to use in dial long line repeater circuits in a step-by-step telephone system; however, the operation of this type of telephone switching equipment is well known and facilitates an understanding of my invention.

At the central office, a subscriber line is provided with a line circuit, such as line circuit 200, to enable the subscriber to originate calls. This line circuit can be any one of a well-known variety and comprises line relay L and cutoff relay CO. When the subscriber connected to line circuit 200 lifts his receiver, the L relay operates thereby grounding start lead ST connected to a line finder and allotter circuit (not shown). The line finder and allotter circuit functions to "find" the line desiring service and connect this line to dial tone in a well-known manner.

At the central office a subscriber line is also provided with an appearance on a connector bank multiple which is representative of the subscriber's telephone number and is used for terminating calls to his line.

In FIG. 2 I have shown connector circuit 201 to illustrate only a portion of the called supervisory and ringing circuitry of a typical step-by-step connector switch. It is well known in the art that a step-by-step connector switch is operated under control of the calling subscriber's dial impulses to cause its wipers to engage the bank contacts of the called subscriber's line and thereby signal the called line. I have simplified the schematic representation of the connector switch by omitting some of the apparatus not pertinent to the understanding of my invention. The apparatus omitted has been represented by dashed lines.

Line circuit 200 has its line conductors L3 and L4 and its sleeve lead S connected to contacts 206, 207 and 208 of the connector bank multiple of connector circuit 201. When connector circuit 201 is actuated by a calling subscriber (not shown), wipers 203, 204 and 205 engage the respective bank contacts 206, 207 and 208, and ringing source 202 is connected to the called line in series with ringing trip relay F to signal the called subscriber on line circuit 200.

When the called subscriber lifts his receiver, ringing trip relay F operates to remove the ringing source and connect the called subscriber's line to called supervisory relay D and to the calling subscriber's talking path by way of condensers C4 and C5. Relay D operates over the called subscriber's closed loop to furnish reverse battery answer supervision to the calling subscriber in a well-known manner.

Referring now to FIG. 1, I have illustrated dial long line repeater circuit 107 connected between line circuit 200 (shown in FIG. 2) and a typical dial telephone subset 100.

Subset 100 comprises dial contacts 101, switchhook contacts 102, and station ringer 103 connected to repeater circuit 107 over line conductors L1 and L2 which include distributed resistances R1 and R2. There is also a certain amount of distributed leakage resistance R3 between line conductors L1 and L2 due to the insulation breakdown between these conductors.

Resistances R1, R2 and R3 are shown by dashed lines to indicate that these resistances are distributed along line conductors L1 and L2 which may extend several thousand feet to remote subset 100.

Of course, it will be obvious that other signaling devices can readily be substituted for subset 100 without departing from the essence of my invention. For instance, one might want to use repeater 107 between two central offices or between a PBX and a central office thereby substituting either a central office or PBX for the subset 100 which I have shown.

As previously mentioned, dial long line repeater 107 is connected between subset 100 and line circuit 200 forming two separate signaling circuits which are interconnected by a repeat coil 104 for the transmission of voice frequencies.

The signaling path connected to the central office will be referred to as a central office signaling loop since in this illustrative embodiment I have employed loop signaling between a subscriber and a central office.

The central office loop, in a normal state, comprises a series circuit extending from battery in FIG. 2, through the lower winding of relay L, line conductor L4 into FIG. 1, diode D4, line conductor L6, winding 106 of repeat coil 104, resistance R4, condenser C1, winding 105 of repeat coil 104, line conductor L5, diode D5, line conductor L3 into FIG. 2, and to ground through the upper winding of relay L.

Across condenser C1 and resistance R4 is a parallel high impedance shunt path through the emitter-collector circuit of transistor Q2.

It will be noted that this series central office loop circuit will not operate subscriber line relay L at this time since condenser C1 blocks the passage of direct current, and when transistor Q2 is "OFF" i.e., in a nonconducting state, sufficient current will not flow across the emitter-collector circuit of transistor Q2 to operate the L relay. When transistor Q2 is turned "ON," however, the emitter-collector circuit assumes a low impedance condition to shunt condenser C1 and resistance R4 allowing enough current to flow over the central office loop to operate the subscriber's line relay L or any other supervisory relay that may be connected to line conductors L3 and L4. In other words, when transistor Q2 is triggered "ON" the central office signaling loop is essentially "CLOSED," and when transistor Q2 is turned "OFF" the central office loop is "OPEN." The successive triggering of transistor Q2 under control of loop signals from subset 100 will cause successive central office loop closures thereby effectively repeating subscriber signals around repeat coil 104 to the central office.

Diodes D1, D2, D3 and D4, connected to the central office loop in FIG. 1, form a full wave rectifier arrangement to maintain negative potential on the emitter and positive potential on the collector of transistor Q2 regardless of what polarity is encountered at the central office. Although transistor Q2 may be biased correctly initially, reversed battery supersivion may be encountered during the establishment of a connection. In the absence of the rectifier arrangement this reverse polarity would back bias the transistor and prevent central office loop closure.

In addition, I have provided varistor V1 to protect transistor Q2 and diodes D1–D4 from damage by any extraneously high voltages that may accidentally be connected to the line conductors L3 and L4.

The subscriber signaling circuit portion of the dial long line repeater 107 can be described if the signaling circuit is considered in each of two possible conditions, namely when central office ringing is present and when central office ringing is not present.

For illustrative purposes, assume that an interrupted central office ringing signal is being received over the central office loop and that ringing relay RR of FIG. 1 is operated in response to each ringing interval and released during each silent interval of the central office ringing signal.

In a first condition, when relay RR is operated, a high voltage alternating-current subscriber ringing loop is formed. This high voltage loop comprises local ringing generator 116, front contacts 3 of relay RR, line conductor L2, high impedance ringer 103 and condenser C3 in parallel with leakage resistance R3, line conductor L1, diode D6, winding 108 of repeat coil 104, and resistance R5 to ground. At bridging point *x* a path parallel to diode D6 and resistance R5 is formed through front contacts 2 of relay RR and through resistance R6 to ground.

In its second or released condition, relay RR forms a low voltage direct-current dialing loop comprising negative battery source 110, resistance R7, winding 109 of repeat coil 104, back contacts 4 of relay RR, line conductor L2, leakage resistance R3, line conductor L1, back contacts 1 of relay R, winding 108 of repeat coil 104, and resistance R5 to ground.

It will be noted that both the dialing and ringing loops contain common resistance R5, and that the circuit parameters of each loop are arranged so that the voltage drop across resistance R5 is essentially the same regardless of whether the high voltage loop parameters or the low voltage loop parameters are effective.

At point *a* adjacent to common resistance R5, I have connected a supervisory transistor Q1 to monitor the voltage at that point. If the subscriber has his receiver on hook, thereby opening switchhook contacts 102, the voltage at point *a* is not sufficient to turn transistor Q1 "ON" regardless of whether the subscriber dialing loop or ringing loop is effective. However, when the subscriber goes off hook, closing switchhook contacts 102 which shunt the ringer impedance 103 and leakage resistance R3, the voltage distribution in the then effective subscriber signaling loop changes to turn transistor Q1 "ON."

Transistor Q1 has its collector connected through resistance R10 to the base of transistor Q2, and when transistor Q1 goes "ON" it triggers transistor Q2 "ON" to shunt condenser C1 thereby repeating switchhook supervision or subscriber loop closure around the repeat coil 104 to effect central office loop closure.

Now let it be assumed that subscriber 100 desires to originate a call, the object being to illustrate in detail how subscriber supervisory signals and dial impulses are repeated by dial long line repeater 107 to the central office on originating calls.

With the subscriber's receiver on hook and switchhook contacts 102 opened, a small amount of current may be flowing through the low voltage loop over the following circuit: negative battery 110, through resistance R7, through winding 109, over conductor 111, thence through back contacts 4 of the RR relay, over conductor L2 including resistance R2, through distributed leakage resistance R3, thence over line conductor L1 including resistance R1, over conductor 112, through back contacts 1 of the RR relay, over conductor 113, thence over conductor 114, through winding 108 and through common resistance R5 to ground.

What leakage resistance R3 exists may be in the order of magnitude of 10,000 ohms or more so that the voltage drop across resistance R5, which may be in the order of 100 ohms, will be very small. Consequently, the base of transistor Q1 connected at point *a* is essentially at a potential more positive than or equal to the potential connected to its emitter. The potential on the emitter of transistor Q1 is supplied over conductor 117 from the center tap *c* of the potentiometer circuit comprising negative battery through resistances R8 and R9 to ground.

When the subscriber 100 lifts his receiver closing switchhook contacts 102, the leakage resistance R3 is shunted by a parallel path through dial contacts 101 and switchhook contacts 102 causing a larger voltage drop across common resistance R5. Point *a* now becomes sufficiently more negative than the emitter of transistor Q1 to turn "ON" transistor Q1 thereby driving the base of transistor Q2 sufficiently in the positive direction to fire transistor Q2. Q2, in conducting causes its emitter-collector circuit to assume a low impedance condition thereby closing the central office loop and operating the subscriber's L relay in FIG. 2. Line relay L operates over the following circuit: battery through the lower winding of the L relay, over conductor 219, through back contacts 2 of cutoff relay CO, thence over line conductor L4, through diode D4, over line conductor L6, through coil 106, over conductor 118, through the low impedance emitter-collector circuit of transistor Q2, over conductor 119, through winding 105, thence over line conductor L5, through diode D5, over line conductor L3, thence through back contacts 1 of cutoff relay CO, over conductor 220, and through the upper winding of relay L to ground. Relay L in operating extends ground over lead ST to the line finder and allotter circuit (not shown).

The line finder and allotter circuit "finds" subscriber line circuit 200 and grounds sleeve lead S operating cutoff relay CO. It also extends line conductors L3 and L4 to the windings of a pulse following relay in the step-by-step first selector switch (not shown), and dial tone is returned over the line conductors and through the repeat coil 104 to subscriber 100.

Subscriber 100 now actuates his dial interrupting the shunt path of resistance R3 and causing momentary high and low impedance changes in the low voltage subscriber dialing loop. These impedance changes are repeated by the successive "OFF" and "ON" conditions of transistors Q1 and Q2 into momentary high and low impedance changes or loop closures in the central office loop. Intermittent central office loop closures actuate the pulsing relay of the first selector causing the selector to "step up" to a bank level corresponding to the first digit dialed.

The subsequent operations necessary to complete the originating call to the called party are well known in the art and will not be discussed here since it is not pertinent to the instant invention.

Now for the purpose of illustrating how dial long line repeater 107 functions to trip the central office ringing signal on a terminating call to subset 100, let it be assumed that connector circuit 201 of FIG. 2 has been actuated by a calling subscriber (not shown) to engage wipers 203, 204 and 205 with bank contacts 206, 207 and 208. Under these circumstances ringing cut-through relay M will have operated in series with line cutoff relay CO. The operating path for these relays can be traced from battery through the winding of relay CO, over control conductor S to contact 208, over wiper 205, thence over conductor 211, through the winding of relay M, and through other equipment in connector circuit 201 (not shown) to ground.

The CO relay, in operating, disconnects subscriber line relay L from the line, and the M relay, in operating, connects central office ringing source 202 in series with ringing trip relay F to the central office loop to operate relay RR in the dial long line repeater 107 of FIG. 1.

The central office ringing signal can be any one of the many types used in telephone switching systems. By way of example I have used interrupted 85 volt R.M.S. 20 cycle alternating-current superimposed on a negative tripping battery. This combination, represented by ringing source 202 and battery 216, provides a ringing cycle comprising a two second alternating-current ringing interval followed by a four second direct-current silent interval. The ringing signal can be tripped during either interval by the operation of ringing trip relay F when the central office loop is closed.

When the interrupted ringing signal is connected to the central office loop by the M relay, relay RR in the dial long line repeater 107 operates during each ringing interval and releases during each silent interval to repeat the ringing signal to subscriber 100. The operating path, during the ringing interval when the alternating-current is applied, can be traced from battery source 216, through ringing source 202, over conductor 217, through the upper winding of relay F, through back contacts 1 of relay F, over conductor 214, through front contacts 2 of relay M, thence over conductor 210 and wiper 204 to bank contact 207, over line conductor L4 into FIG. 1, thence over conductor 120, through thermistor 115, over conductor 121 and through the winding of relay RR, over conductor 122, through condenser C6, over conductor 123, thence over line conductor L3 into FIG. 2 and to bank contact 206, over wiper 203 and conductor 209, through front contacts 1 of relay M, over conductor 212, through back contacts 5 of ringing trip relay F, over conductor 218 and through ringing source 202 to ground.

The thermistor 115, diode D1 and condenser C6 combination make relay RR perform as a slow operating alternating-current relay. This circuitry is old and well known in the art and prevents the RR relay from following dial pulses during intermittent central office loop closures.

Although current is flowing through the upper winding of relay F during each ringing interval, relay F will not operate until the central office loop is closed completing a low impedance direct-current operating circuit.

Through its own contacts 3, relay RR connects a local high voltage ringing generator 116 to subset 100 over line conductor L2, through station ringer 103, thence through condenser C3, and back over line conductor L1, to bridging point *x*. In its released condition relay RR connects low voltage battery source 110 through resistance R7, winding 109 of repeat coil 104, over conductor 111, through its own back contacts 4 over conductor L2, through distributed leakage resistance R3 and back over line conductor L1 to the same bridging point *x*.

At bridging point *x* I have provided a voltage dividing network to regulate the voltage applied at the base of transistor Q1 to a prescribed value below that which is necessary to turn Q1 "ON." This voltage regulating circuitry is under the control of the central office ringing signal to limit the voltage applied to the base of supervisory transistor Q1 during the ringing interval and yet permit the base to attain sufficient voltage to turn Q1 "ON" when the subscriber goes off hook.

The voltage dividing network is capable of assuming two conditions, one corresponding to the operated RR relay, and the other condition corresponding to the released RR relay. In its first condition, with the RR relay operated, the high voltage ringing generator is connected over the previously traced path to point *x*, over conductor 112, through front contacts 2 of relay RR and through by-pass resistance R6 to ground. In parallel with this path and starting at point *x* is the remaining portion of the subscriber ringing loop circuit through gating diode D6, over conductor 114, through winding 108 of repeat coil 104, thence through common resistance R5 to ground. Most of the voltage applied to the voltage dividing network is dropped across resistance R6 since diode D6 is in a high impedance state and passes little or no current at this time, thereby keeping the voltage at point *a* below that which is necessary to trigger Q1 "ON."

Now should subscriber 100 go off hook during the ringing interval and shunt his station ringer 103 by closing switchhook contacts 102, the voltage distribution in the high voltage subscriber ringing loop is altered causing a higher voltage drop across resistance R6 and diode D6.

Diode D6 is a voltage responsive variable impedance that will remain in a high impedance condition until a certain breakdown voltage is applied across it. When this breakdown value is exceeded the diode will break down and assume a low impedance condition. The low impedance condition, once achieved, can then be sustained by a small voltage across the device.

Gating diode D6 is designed to break down at the voltage applied across it when the subscriber goes off hook during the ringing interval to raise the voltage at point *a* and cause supervisory transistor Q1 to go "ON." Q1 turns Q2 "ON," and Q2 closes the central office loop to operate ringing trip relay F in the central office connector 201 of FIG. 2.

Relay F, in operating, locks to its own contact 3, disconnects ringing source 202 from the central office loop at its contacts 1 and 5, and connects called supervisory relay D to the central office loop at its front contacts 2 and 4. Supervisory relay D operates over the closed central office loop and returns answer supervision to the calling subscriber (not shown).

When the ringing source 202 of FIG. 2 was removed from the central office loop, the RR relay of the dial long line repeater 107 released disconnecting the local ringing generator from the subscriber's line and reconnecting low voltage talking battery 110 to subscriber subset 100.

Transistors Q1 and Q2 remain turned "ON" maintaining the central office loop closed as long as subscriber 100 is off hook.

For the previous discussion it was assumed that the subscriber lifted his receiver during the ringing interval. If the subscriber had gone off hook during the silent interval when relay RR was released, the voltage dividing network connected to point *x* would be in its second condition whereby gating diode D6 is shunted via conductor 112, back contacts 1 of the RR relay and conductor 113 and the parallel by-pass through resistance R6 is disconnected. With the subscriber 100 off hook and relay RR released, the circuit operation for closing the central office loop is identical to that previously described in conjunction with subscriber 100 originating a call, but instead of operating the line relay L as in the originating call, the closed central office loop operates the ringing trip relay F in the connector circuit thereby disconnecting the central office ringing signal.

In FIG. 3 I have used the same reference letters and numerals for the components shown in FIG. 1 and have rearranged a portion of FIG. 1 to assist in understanding the nature of the dual circuit signaling aspect of FIG. 1.

The bridge network for controlling transistor Q2 comprises four arms connected between points *a*, *b*, *c* and *d* with transistor Q1 across points *a* and *c* and a voltage source across points *b* and *d*. Ratio arms *a–b* and *b–c* have equal resistances R5 and R9 respectively, and arm *d–c* has a resistance R8 equal in value to the subscriber's on-hook loop impedance connected to points *a* and *d*.

The bridge is substantially balanced when the subscriber is on hook, and the voltage across points *a* and *c* is small or its polarity is such that transistor Q1 will be turned "OFF." When the subscriber goes off hook, thereby reducing the loop impedance in arm *a–d*, the voltage across points *a* and *c* is sufficiently raised to turn Q1 "ON."

It will be remembered that the subscriber loop is alternately switched between a high voltage ringing loop and a low voltage dialing loop under control of relay RR. When this occurs the bridge is still maintained in a balance condition since the arm *a–d* is also altered under control of relay RR.

With relay RR normal, arm *a–d* comprises resistance R7, the resistance of coil 109, resistances R2, R3 and R1 and the resistance of coil 108. At this time low voltage source 110 is applied across points *b* and *d* of the bridge.

With the RR relay operated, arm *a–d* includes resistances R2 and R1, resistance R3 in parallel with impedances 103 and C3, diode D6 and the resistance of coil 108. At this time low voltage source 110 and a small portion of high voltage ringing source 116 is applied across points *b* and *d* of the bridge.

From the above description it will be apparent that I have provided a signaling arrangement adaptable to receive signals of inconstant magnitude on a signaling channel and means for controlling these signals from a remote point over the same channel wherein the control means is sensitive to variations of the signal over a wide range of signal magnitudes.

While there has been shown and described here one preferred embodiment of the invention, it will readily occur to those skilled in the art that changes can be made thereto without departing from the true spirit and scope of the invention.

What is claimed is:

1. A signaling arrangement comprising a signaling path adapted to receive signals and including an alterable impedance; said signaling arrangement also comprising a signaling device separate from said path and circuit means controlled by said device for altering said impedance, said circuit means comprising (I) a first signaling circuit comprising high voltage source and indicating means, (II) a second signaling circuit comprising a low voltage source and said indicating means, (III) voltage monitoring means connected to said indicating means and responsive to an energizing voltage at said indicating means for altering said impedance, (IV) a controllable voltage dividing network, and (V) switching means responsive to an undulating signal on said path for rendering effective said first and second signaling circuits by alternately connecting said high and low voltage sources through said signaling device and said network to said indicating means, (VI) said voltage dividing network comprising means controlled by said switching means to adjust the voltage at said indicating means to a de-energizing voltage, (VII) said signaling device including means operable to alter the then effective signaling circuit to cause said voltage at said indicating means to achieve said energizing voltage.

2. A signaling arrangement comprising a signaling path including a repeat coil having a first pair of windings and a second pair of windings; a shuntable condenser serially connected with said first pair of windings; a signaling device including a high impedance current path connected to said second pair of windings; and circuit means controlled by said device for shunting said condenser; said circuit means comprising (I) a common resistance;

(II) a first signaling circuit including a high voltage alternating-current source connectable through said current path to said common resistance;

(III) a second signaling circuit including a low voltage direct-current source connectable through said current path to said common resistance;

(IV) a shunting transistor;

(V) a monitoring transistor having a base connected to said common resistance and responsive to a particular voltage condition at said common resistance for triggering said shunting transistor to shunt said condenser;

(VI) an operable and releasable relay having a winding connected to said signaling path and responsive to an intermittent signal on said sigaling path for alternately connecting said alternating-current source and said direct-current source through said high impedance path to said common resistance to effect at said common resistance a predetermined voltage condition different from said particular voltage condition;

(VII) and an alterable voltage dividing network controlled by said relay to assume a first condition for preventing said common resistance from achieving said particular voltage when said high voltage alternating-current source is connected thereto and controlled by said relap to assume a second condition for permitting said common resistance to achieve said predetermined voltage condition when said low voltage direct-current is applied;

(VIII) said signaling device comprising means for shunting said high impedance path to cause said voltage condition at said common resistance to achieve said particular voltage condition irrespective of the condition of said network.

3. A telephone signaling arrangement comprising an open central office signaling loop, a subscriber telephone line including a station signaling device separate from said central office loop, a repeat coil connected between said subscriber line and said central office loop, and signal repeating means for repeating central office signals around said repeat coil to said subscriber and for repeating subscriber signals around said repeat coil to close said central office loop; said signal repeating means comprising (I) a high voltage subscriber loop, (II) a low voltage subscriber loop, (III) supervisory means connected to both said subscriber loops and responsive to a particular voltage condition in a said subscriber loop for effecting central office loop closure, (IV) and switching means under control of said central office signals for alternately connecting said subscriber line to said high voltage loop and to said low voltage loop and for establishing in each connected loop a predetermined voltage condition characteristic of the said then connected loop;

(V) wherein said subscriber signaling device comprises means effective to change a said predetermined voltage condition to said particular voltage condition in the then effective subscriber loop to cause said supervisory means to close said central office loop.

4. The invention defined in claim 3

(I) wherein said subscriber line comprises a high impedance telephone station ringer and line leakage impedance;

(II) wherein a first resistance is provided and is connected to said supervisory means;

(III) wherein said high voltage loop comprises a local high voltage ringing source, an enabled gating element, and said first resistance connectable in series with said ringer impedance to establish at said first resistance a first predetermined voltage characteristic of said high voltage loop;

(IV) wherein said low voltage loop comprises a low voltage source, a disabled gating element and said first resistance connectable in series with said leakage impedance to establish at said first resistance a second predetermined voltage characteristic of said low voltage loop;

(V) and, wherein said station signaling device comprises means operable to shunt said ringer impedance and said leakage impedance to cause said voltage at said resistance to achieve said particular voltage irrespective of the then connected one of said voltage sources.

5. The invention defined in claim 4

(I) wherein said switching means comprises a relay having an energizing winding, a plurality of front contacts and a plurality of back contacts, (II) wherein said enabled gating element and said disabled gating element comprise a single gating element adapted to be selectively enabled and disabled, (III) wherein said central office signals are intermittent central office ringing signals for intermittently energizing said winding to alternately connect said high voltage source and said low voltage source to said line and to alternately enable and disable said gating element, (IV) and wherein said station signaling device comprises closable switchhook contacts and closable dial contacts.

6. The invention defined in claim 5

(I) wherein said enabled gating element comprises a voltage controlled variable impedance in series with said first resistance and comprises a by-pass resistance in shunt of said variable impedance and in shunt of said first resistance, and (II) wherein said disabled gating element comprises an electrical path in shunt of said variable impedance.

7. A telephone signaling arrangement comprising an open central office loop adapted to receive interrupted central office ringing signals; a telephone subscriber line comprising leakage resistance, said subscriber line having a subset thereon comprising operable dial contacts and operable switchhook contacts for signaling on said subscriber line and comprising a station ringer for signaling said subscriber; a repeat coil interconnecting said central office loop with said subscriber line; first resistance means connected to said subscriber line; a first transistor connected to said first resistance means; a second transistor connected to said central office loop and to said first transistor; said first resistance means being responsive to a said signal on said subscriber line for causing said second transistor to close said central office loop; a subscriber ringing circuit and a subscriber dialing circuit each connectable to said subscriber line; switching means connected to said central office loop and controlled by a received interrupted central office ringing signal on said loop for alternately connecting said ringing circuit and said dialing circuit to said subscriber line; said ringing circuit comprising a first series circuit including a high voltage ringing source, said station ringer, a variable impedance, and said first resistance; said ringing circuit also comprising a second resistance in parallel with said variable impedance and said first resistance; and said dialing circuit comprising a second series circuit including a low voltage source, said leakage resistance and said first resistance.

8. In a telephone system, a central office, a subscriber line having a station thereon, and a long line repeater circuit interconnecting said subscriber line and said central office, said repeater circuit including an impedance bridge including as one arm thereof said subscriber line and said station and having a transistor connected thereacross, said bridge being balanced when said station is in its on-hook condition and unbalanced when said station is in its off-hook condition, means responsive to a change of state of said transistor upon the unbalancing of said bridge for signaling said central office, a ringing relay, means responsive to signals from said central office for operating said ringing relay, means responsive to operation of said ringing relay for including a breakdown diode in said one arm of said bridge while maintaining said bridge balanced, and said subscriber station comprising means effective in going off-hook during operation of said ringing relay to cause said diode to break down to its low impedance state to unbalance said bridge.

9. In a telephone system, a central office, a high impedance subscriber line, a station connected to said subscriber line and a repeater circuit interconnecting said subscriber line and said central office, said repeater circuit including a resistor connected to one side of said subscriber line, a low voltage source connected to the other side of said subscriber line, operable detector means connected to said resistor, a high voltage ringing source at said repeater, a ringing relay responsive to a signal from said central office, and means responsive to operation of said ringing relay for disconnecting said low voltage source from said other side of said subscriber line and for connecting thereto said high voltage ringing source and for interposing between said resistor and said one side of said subscriber line a breakdown device having a sufficiently high resistance to prevent operation of said detector means, said station comprising means effective to change the impedance condition of said subscriber line during the operation of said relay for causing said breakdown device to assume a low impedance condition thereby to operate said detector means.

10. In a telephone system, a central office, a subscriber line having a station thereon, and a dial pulse and ringing repeater interconnecting said central office and said subscriber line, said repeater including a supervisory detector, detector circuitry including a low voltage source and a resistor, said detector being connected to said resistor, a high voltage ringing source, and means responsive to a ringing signal from said central office for removing said low voltage source from said detector circuitry, for including said high voltage ringing source therein, and for changing said detector circuitry to maintain a constant electrical condition at said detector.

11. The invention defined in claim 10 wherein said subscriber station in going off-hook during the presence of said ringing signal from said central office comprises means effective to change the electrical condition at said detector.

12. The invention defined in claim 11 wherein is provided a breakdown diode, wherein said responsive means in changing said detector circuitry comprises means for inserting said diode in series with said high voltage source, and wherein said subscriber station in going off-hook causes the diode to break down thereby to effect the said change of electrical condition.

References Cited in the file of this patent

UNITED STATES PATENTS

| | | |
|---|---|---|
| 2,282,464 | Edwards et al. | May 12, 1942 |
| 2,462,144 | Theillaumas | Feb. 22, 1949 |
| 2,498,723 | Theillaumas | Feb. 28, 1950 |
| 2,594,007 | Gardere | Apr. 22, 1952 |
| 2,680,784 | Grandstaff | June 8, 1954 |
| 2,810,081 | Elliott | Oct. 15, 1957 |
| 2,904,641 | Radcliff | Sept. 14, 1959 |